April 11, 1950     E. V. SCHNEIDER     2,503,971
SPINDLE AND BEARING ASSEMBLY
Filed June 28, 1947     2 Sheets-Sheet 1
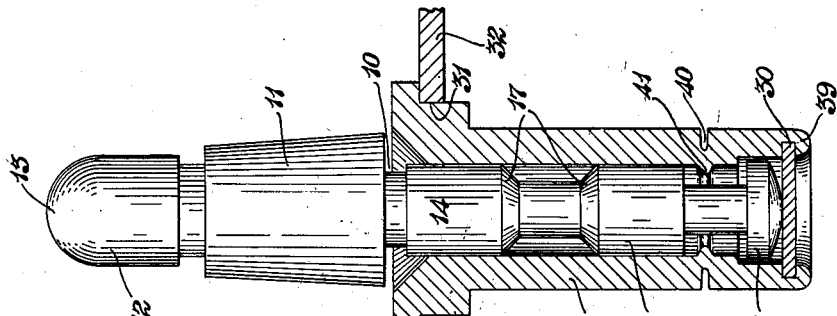
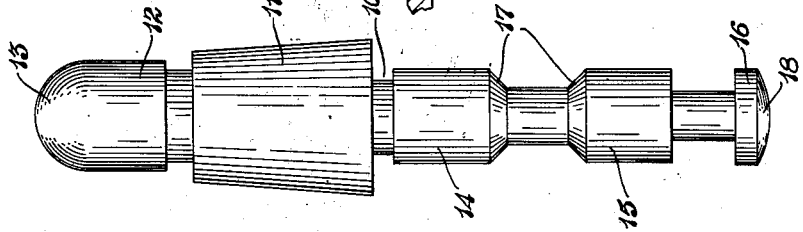
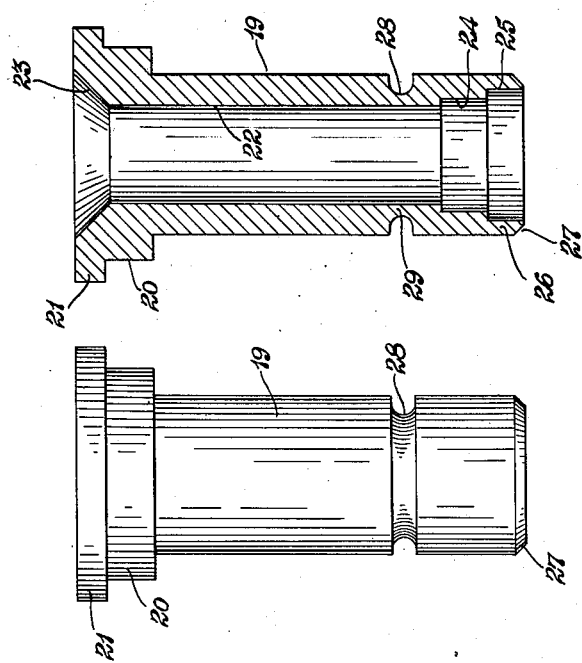
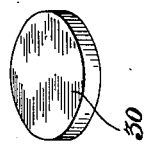
Inventor
*Emmor V. Schneider*
By *Freas and Bishop*
Attorneys

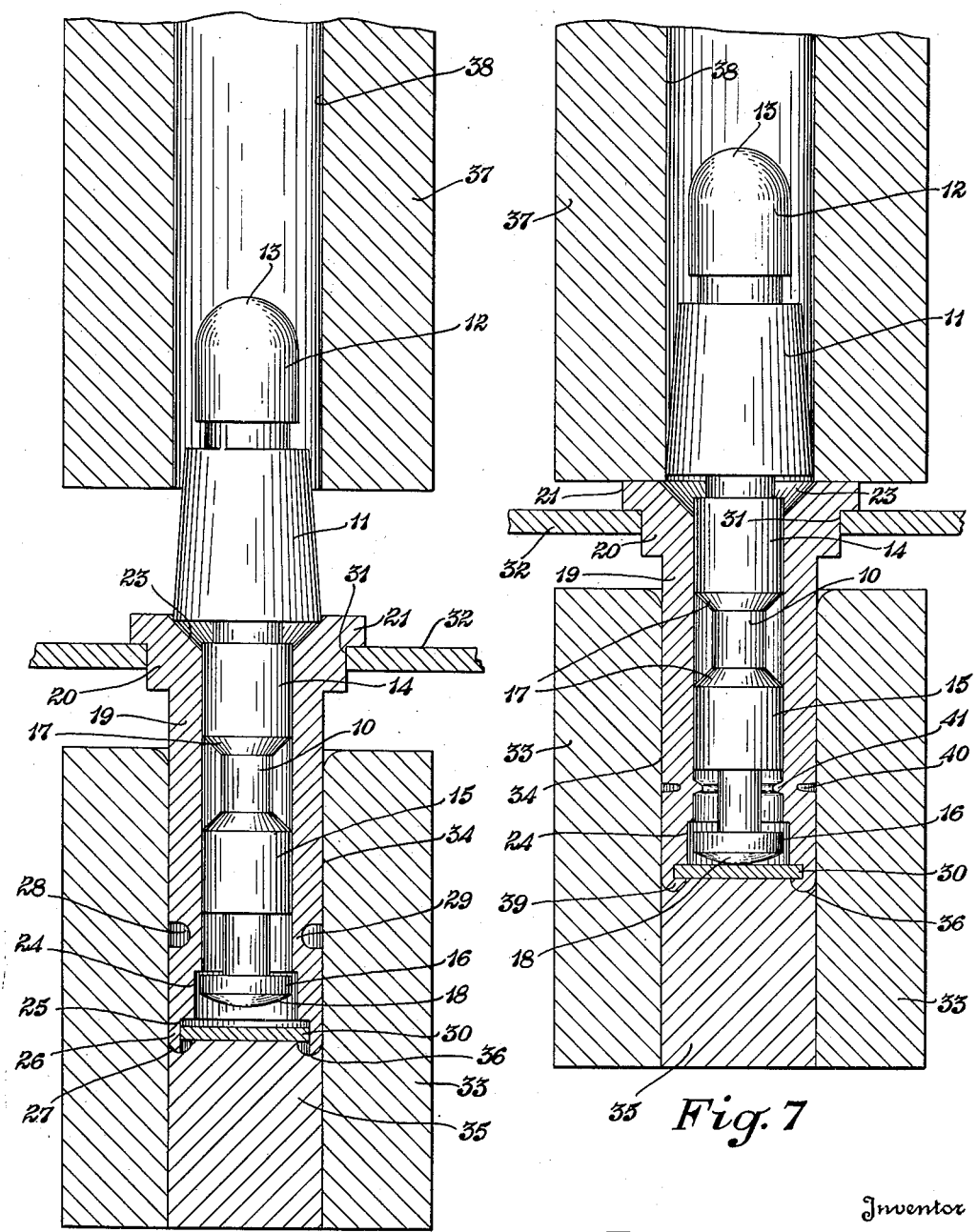

Patented Apr. 11, 1950

2,503,971

UNITED STATES PATENT OFFICE 2,503,971

SPINDLE AND BEARING ASSEMBLY

Emmor V. Schneider, Alliance, Ohio, assignor to The Alliance Manufacturing Company, Alliance, Ohio, a corporation of Ohio Application June 28, 1947, Serial No. 757,838

4 Claims. (Cl. 308—150)

The invention relates to spindles for phonograph turntable and more particularly to a spindle having sealed lubrication which is free from oil drip.

In the conventional construction of phonograph turntables the spindle is located entirely through an open ended bearing, the thrust being taken by a fibre washer at the top of the bearing engaged by a shoulder on the spindle. The lower end of the spindle projects through the open lower end of the bearing and a hair pin cotter therein retains the spindle in the bearing. As a consequence a stiff lubricant must be used in order to keep it in the bearing, and even then the friction produced by rotation of the spindle will cause the lubricant to leak from the open lower end of the bearing. This is of course objectionable in itself and also requires periodic lubrication of the spindle.

Another objection to the conventional construction is that considerable friction is produced by the thrust bearing above referred to, wherein the thrust is taken up by the fibre washer at the top of the bearing.

It is an object of the invention to provide a phonograph turntable spindle which overcomes the above mentioned disadvantages and objections.

Another object is to provide a turntable spindle in which the friction is reduced to a fraction of the conventional construction.

A further object is to provide a turntable spindle and bearing which will be free from oil drip.

A still further object is to provide such a turntable spindle and bearing assembly having lifetime sealed lubrication.

Another object of the invention is to generally improve and simplify the construction of turntable spindles.

The above objects together with others which will be apparent from the drawings and following description, or which may be later pointed out in detail, may be attained by constructing the improved turntable spindle in the manner hereinafter described in detail and illustrated in the accompanying drawings, in which Figure 1 is a longitudinal sectional view of an assembled phonograph turntable spindle and bearing constructed in accordance with the invention;

Fig. 2 is a side elevation of the spindle;

Fig. 3 a longitudinal section of the bearing before it has been deformed;

Fig. 4 a side elevation of the bearing shown in Fig. 3;

Fig. 5 a perspective view of the sealing disc;

Fig. 6 a longitudinal sectional view of the spindle located within the bearing and assembled in the deforming tools; and, Fig. 7 a view similar to Fig. 6 after the deforming operation.

The improved spindle to which the invention pertains is indicated generally at 10 and has the truncated conical portion 11 near its upper end for mounting the usual phonograph turntable thereon, terminating upwardly in the reduced straight portion 12 having the rounded upper end 13.

Below the conical portion 11 the spindle is provided with the spaced, enlarged, straight or cylindrical portions 14 and 15 and the head 16 at its lower end. The opposed ends of the portions 14 and 15 may be conical as indicated at 17 to form a section for retaining grease and the lower end of the head 16 is rounded in the form of a segment of a sphere as indicated at 18.

The bearing in which the spindle is journalled is formed in the shape of a hollow cylinder, indicated generally at 19, having the enlarged cylindrical portion 20 at its upper end portion terminating in the peripheral flange 21.

The longitudinal cylindrical opening 22 through the bearing 19 may be outwardly flared or coned at its upper end as shown at 23 and the lower portion of this opening is enlarged as indicated at 24 and further enlarged as at 25 forming the relatively thin cylindrical wall 26 at the lower end of the bearing, the terminal end of which is preferably tapered or coned as indicated at 27.

At a point spaced from the lower end of the bearing, a substantially half-round peripheral groove 28 is formed around the exterior of the bearing providing the relatively thin walled section 29 at this point.

A sealing disc 30, together with the spindle 10 and bearing 19, completes the spindle and bearing assembly. This disc is of such diameter that it will have an easy sliding fit within the enlarged opening 25 at the lower end of the bearing. The three parts above described, forming the spindle and bearing assembly, may be made of any suitable metal.

To assemble the spindle and bearing in a phonograph the enlarged, cylindrical portion 20 of the bearing is tightly staked within the aperture 31 in the usual cabinet plate 32 of the phonograph, which is usually in the form of a metal plate of sufficient tickness to support the turntable and the motor drive mechanism therefor.

The portion of the spindle 10 below the enlarged conical portion 11 thereof is greased and inserted within the bearing 19 within which it freely slides. The sealing disc or slug 30 is inserted into the enlarged opening 25 at the lower end of the bearing and the assembly is then inserted into the tools shown in Fig. 6.

These tools may include the block 33, which may be mounted upon the bed or table of a press or the like, and is provided with the cylindrical opening 34 to receive the bearing 19, an anvil block 35 being located in the lower portion of the opening 34 and having the substantially half-round peripheral groove 36 at its upper end to receive the tapered lower edge 27 of the bearing.

The upper tool, carried by the ram of the press, may comprise the block 37 having the central opening 38 of sufficient diameter to slide freely over the enlarged conical portion 11 of the spindle.

With the parts assembled in the position shown in Fig. 6, the ram of the press is operated to lower the block 37, the lower end of said block engaging the upper end of the bearing 19 subjecting the bearing to vertical pressure which curls the thin walled lower end 26 of the bearing over the sealing disc or slug 30 as indicated at 39 in Fig. 7 and distorts or deforms the thin walled section 29 of the bearing 19, reducing the width of the peripheral groove 28 in the bearing as indicated at 40 in Fig. 7 and forming the inwardly disposed annular rib 41 within the central opening of the bearing between the enlarged cylindrical portion 15 of the spindle and the head 16 at the lower end thereof, so as to prevent withdrawal of the spindle from the bearing.

In this position it will be seen that the semispherical lower end 18 of the head 16 of the spindle rests upon the sealing disc 30 so as to take the thrust of the spindle.

With this construction the spindle is retained and sealed within the bearing which contains an ample supply of lubricant for the life of the device, thus providing life-time sealed lubrication free from drip, and greatly reducing the friction over the conventional type of phonograph turntable spindle. It has been found by experience that friction due to thrust is only one-third of that in the conventional construction.

I claim:

1. A spindle and bearing assembly comprising a hollow, cylindrical bearing, a sealing disc fixed within the lower end of the bearing, and a spindle journalled within the bearing and having a rounded inner end in contact with the sealing disc to take the thrust of the spindle, the spindle having a reduced portion intermediate its ends and an inwardly disposed annular rib in the bearing located within said reduced portion to prevent removal of the spindle from the bearing.

2. A spindle and bearing assembly comprising a hollow, cylindrical bearing having an internal shoulder near its lower end and terminating in a thin walled section below said shoulder, a sealing disc within the lower end portion of the bearing located against said shoulder, said terminal thin walled sections of the bearing being curled inwardly and upwardly against said sealing disc, a spindle journalled within the bearing and having a rounded inner end in contact with said sealing disc to take the thrust of the spindle, the spindle having a reduced portion intermediate its ends and an inwardly disposed annular rib in the bearing located within said reduced portion to prevent removal of the spindle from the bearing.

3. A spindle and bearing assembly comprising a hollow, cylindrical bearing, a sealing disc fixed within the lower end of the bearing, a spindle journalled within the bearing and having a rounded inner end in contact with the sealing disc to take the thrust of the spindle, the spindle having a reduced portion intermediate its ends and the bearing having an intermediate thin walled section deformed to provide an inwardly disposed annular rib located within said reduced portion to prevent removal of the spindle from the bearing.

4. A spindle and bearing assembly comprising a hollow, cylindrical bearing having an internal shoulder near its lower end and terminating in a thin walled section below said shoulder, a sealing disc within the lower end portion of the bearing located against said shoulder, said terminal thin walled sections of the bearing being curled inwardly and upwardly against said sealing disc, and a spindle journalled within the bearing and having a rounded inner end in contact with said sealing disc to take the thrust of the spindle, the spindle having a reduced portion intermediate its ends and the bearing having an intermediate thin walled section deformed to provide an inwardly disposed annular rib located within said reduced portion to prevent removal of the spindle from the bearing.

EMMOR V. SCHNEIDER.

REFERENCES CITED

The following references are of record in the file of this patent:

UNITED STATES PATENTS

| Number | Name | Date |
| --- | --- | --- |
| 147,760 | Spire | Feb. 24, 1874 |
| 471,328 | Pelton | Mar. 22, 1892 |
| 1,293,165 | Nainteau | Feb. 4, 1919 |
| 1,366,132 | Pitkin | Jan. 18, 1921 |
| 1,547,297 | Case | July 28, 1925 |

FOREIGN PATENTS

| Number | Country | Date |
| --- | --- | --- |
| 334,953 | Germany | Mar. 23, 1921 |
| 462,014 | France | Jan. 17, 1914 |